Nov. 26, 1968    H. C. GORDON ET AL    3,412,752
AIR ADMISSION REGULATOR VALVE FOR INTERNAL COMBUSTION ENGINE
Filed April 27, 1967
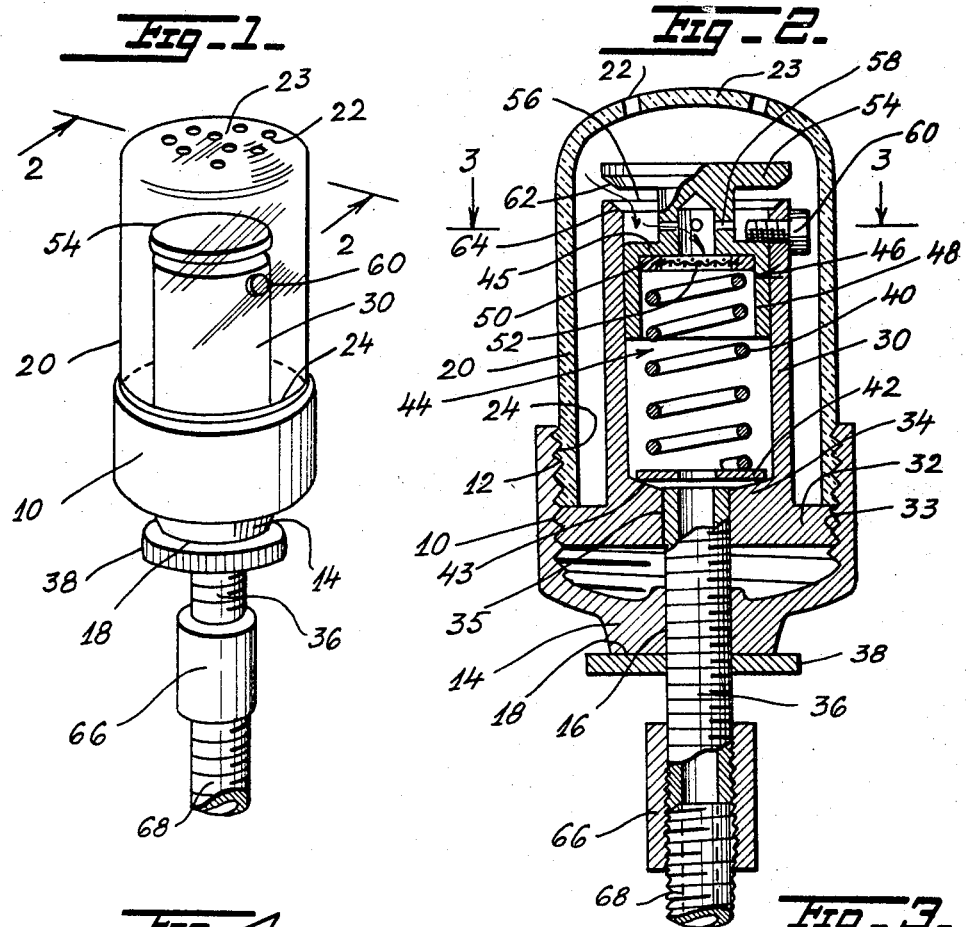
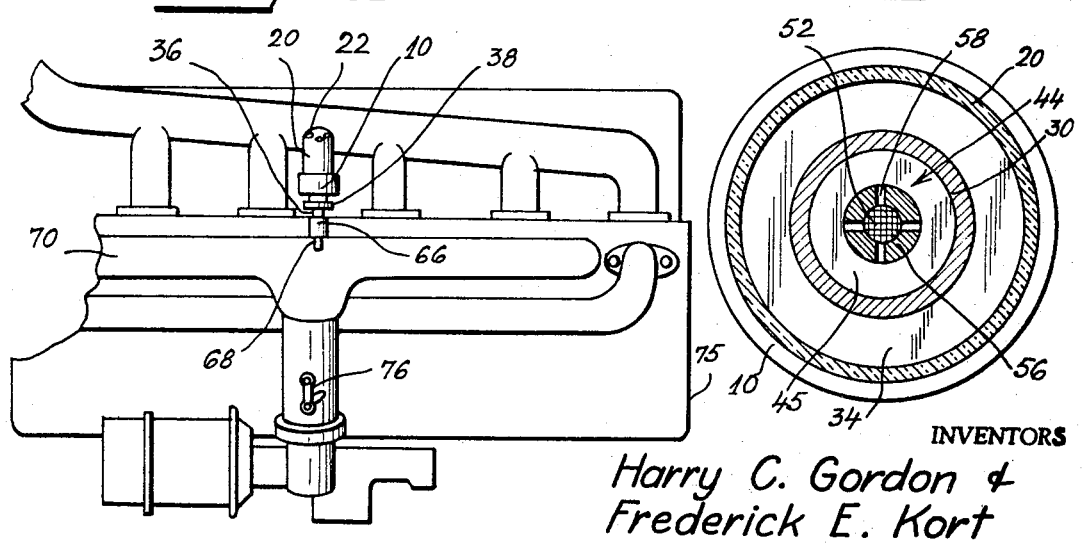
INVENTORS
Harry C. Gordon &
Frederick E. Kort
BY *Polachek & Saulsbury*
ATTORNEYS 3,412,752
AIR ADMISSION REGULATOR VALVE FOR
INTERNAL COMBUSTION ENGINE
Harry C. Gordon, P.O. Box 542, New York, N.Y. 10036, and Frederick E. Kort, 216 Eastern Way, Rutherford, N.J. 07070
Filed Apr. 27, 1967, Ser. No. 634,369
10 Claims. (Cl. 137—480)

ABSTRACT OF THE DISCLOSURE

The disclosure describes a valve which regulates admission of air into the air intake manifold of an internal combustion engine. The valve has an outer casing through which holes are provided through which air enters the valve. Inside the casing is a valve cylinder with a slidable spring biased piston head. The piston head is normally open except when suction is sufficient in the valve cylinder to permit the piston head to close the valve cylinder by externally applied air pressure.

---

The invention is an improvement over the air admission regulator valve described in United States Patent 2,331,393. The present invention has a simpler and more rugged construction. Air filtration is improved.

It is one object of the invention to provide an improved air admission regulator valve for an internal combustion engine, the valve having internally threaded shell in which is engaged both an outer apertured casing and an inner cylindrical valve cylinder, the casing serving to lock the cylinder in the shell and to admit air to the cylinder.

A further object is to provide an air admission regulator valve as described wherein the valve cylinder has a spring biased head for closing the valve cylinder when sufficient air suction exists in the cylinder, or stated another way, when sufficient air pressure differential exists between low pressure in the cylinder and atmospheric pressure in the outer casing.

Still another object is to provide an air admission regulator valve as described, provided with means for adjusting tension in the spring.

Another object is to provide a valve as described which is entirely automatic in operation, the valve being held in open position at running speeds of the engine and being drown into closed position when the engine idles or when pressure differential in the valve exceeds a predetermined magnitude.

Normally internal combustion engines are designed for perfect or optimum fuel-air balance. Such a condition of perfect balance cannot be maintained indefinitely. Loss in various degrees of balance will occur depending on many factors, but principally due to wear of engine parts. As a result, fuel is not thoroughly exploded in combustion chambers, lowering volumetric efficiency and waste of fuel. Other undesirable side effects occur such as contamination of lubrication oil by waste fuel, which in turn leads to deterioration of bearings and other parts. The present invention contributes to the prevention of such means by employing the vacuum differential between pressure within the intake manifold of an internal combustion motor and the outside air pressure. The invention serves as a metering device for admission of auxiliary air needed to correct the imbalance and restore the efficiency of operation for which the motor was originally designed.

When properly installed, the device admits air to the intake manifold of an internal combustion engine whenever the engine is operating with throttle open to at least a predetermined extent. Thus a saving in fuel is effected at ordinary running speeds by admission of extra air to the fuel-air mixture, but admission of extra air at lower or idling speed is prohibited so that no interference can occur with smooth operation of the engine when lightly loaded.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a device embodying the invention.

FIG. 2 is an enlarged vertical central sectional view taken on the line 2—2 of FIG. 1.

FIG. 3 is a cross sectional view taken on line 3—3 of FIG. 2.

FIG. 4 is a reduced side view of the device shown mounted in place on the air intake manifold of an internal combustion motor.

Referring to the drawings, there is shown in FIGS. 1–4 an air regulator device comprising a cylindrical shell 10 having an internally threaded wall 12. The shell has a tapered bottom extension 14 which is formed with a threaded bore 16. The shell is open at the top. It has a flat wall 18 at the bottom.

Detachably seated in the shell 10 is a cylindrical transparent dome 20 which serves as an external casing for the device. This dome has a plurality of fine holes 22 at its closed top end 23. The dome is open at the bottom. The cylindrical wall of the dome is formed with an external thread 24 at the bottom. This thread engages with the threaded wall 12 of the shell.

Inside the casing and shell is a valve cylinder 30. This valve cylinder has an annular radially extending flange 32 at its bottom end. The flange is externally threaded and this thread 33 engaged with the threaded wall of the shell. The dome 20 screws down firmly on the flange 32 and thus serves as a lock nut to hold the valve cylinder in fixed position with respect to the shell 10. The cylinder has a bottom wall 34 formed with a central unthreaded bore 35 through which extends a threaded nipple 36. The nipple is engaged in threaded bore 16 of the shell. A lock nut 38 on the nipple can be screwed up tight against flat bottom wall 18 of the shell to lock the nipple in desired axial extension in the shell and valve cylinder.

Inside the valve cylinder which is open at the top is a coil spring 40. The bottom end of the spring bears on a washer 42 resting on a seat 43 formed at the bottom of the cylindrical cavity 44 in the cylinder. The upper end of the spring bears against shoulder 45 of a piston 46. This piston has a cylindrical skirt 48 which surrounds and retains the spring. The skirt slides axially inside the wall of cavity 44. If desired a ring 50 can be interposed between the top of the spring and the shoulder 45. A fine mesh screen 52 can be secured in ring 50 for screening out foreign particles from air entering the valve cylinder.

Piston 46 has an annular head 54 formed in top of cylindrical neck 56 which extends upwardly of shoulder 45. A plurality of fine holes 58 for admitting air to the cylinder are provided in neck 56 as clearly shown in FIGS. 2 and 3. To prevent the piston from coming axially upward out of the cylinder, there is provided a screw 60 which extends radially inward of the cylinder. Piston head 54 may have a beveled edge 62 which can seat on ground beveled edge 64 at the open top of the cylinder to close off passage of air into the valve cylinder.

The device can be provided with a sleeve fitting 66 which can connect nipple 36 with another externally threaded nipple 68. Nipple 68 can be inserted in a centrally located tapped hole in air intake manifold 70 of engine of motor 75 shown in FIG. 4. The device will be located between the usual throttle valve 76 and fuel intake valves of the motor cylinders. The fitting 66 will be screwed down on nipple 68 until nipple 68 meets nipple 36. Thus the device will be locked in an axially vertical position to the manifold 70. The interior of cylinder 30 is thus exposed to suction in the intake manifold.

In operation of the device, whenever the throttle valve is closed to such an extent that the engine idles, maximum suction is applied to the interior of the cylinder 30. Inside of dome 20 is atmospheric air pressure. The excess air pressure closes the valve cylinder by pressing the piston head 54 down on the open top of valve cylinder 30. Now if the throttle is opened to run the engine faster under load, the valve will open since air pressure in the air intake manifold and valve cylinder rises. Thus extra air will be supplied to the fuel-air mixture to effect optimum efficiency in fuel consumption. The outside air pressure operates against tension in spring 40. By adjusting the extension of nipple 36 into the valve cylinder the tension of the spring can be adjusted as the top of the nipple bears against the underside of washer 42. It will be noted that it is not necessary to loosen the lock-nut 38 or to rotate shell 10 on the nipple 66 to adjust the nipple. It is possible to remove dome 20 and then to turn the valve cylinder 30 in the shell 10. This will move the cylinder axially with respect to the nipple while the nipple remains fixed with respect to the shell. Such an arrangement is highly desirable where the part of the nipple extending out of the shell 10 into the fitting 66 is at its minimum setting so the nipple 36 cannot be screwed further into the shell 10. The available length of nipple 36 between the bottom of cylinder 30 and the bottom of the shell 10 will be sufficient to effect proper adjustment of the spring tension.

By proper adjustment of the device, the valve will close when the engine idles and will open when the throttle is opened to speed up the engine. Extra air will be fed to the engine when required, but will not be supplied when the engine idles. Thus smooth running of the engine at light loading will not be interfered with by opening of the valve to thin the air-fuel mixture.

The device can easily be installed in any conventional internal combustion engine. It will provide long, useful, trouble-free service. The device is relatively inexpensive to manufacture. It can be quickly disassembled for cleaning and inspection internally without having to remove shell 10 and nipple 36 from the engine. This constitutes another feature of convenience and improvement afforded by the invention.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. An air admission regulator valve for the air intake of an internal combustion engine, comprising a generally cylindrical shell having open and closed opposite ends, said shell being internally threaded, a generally cylindrical valve cylinder having closed and open opposite ends with a radially outward extending annular flange at the closed end of the cylinder formed with a peripheral thread, said cylinder and shell being coaxially disposed with said flange screwed into said shell, a dome having closed and open opposite ends, the open end of the said dome being externally threaded and screwed into the shell to bear on said flange and to hold the same in the shell, the closed end of said dome having fine openings therein for admitting atmospheric air to said cylinder while the cylinder is enclosed within the shell and dome, a piston with cylindrical skirt movable axially in the cylinder, said piston having a head extending outwardly of the open end of the cylinder and arranged to seat on the open end of the cylinder for cutting off passage of air from the dome to the interior of the cylinder, a coil spring in the cylinder bearing on the closed end thereof and on said piston to bias the piston head outwardly of the open end of the cylinder, the closed ends of the shell and cylinder having central bores to expose the interior of the cylinder to pressure in the intake manifold of an internal combustion engine, whereby said piston head is pressed down on the cylinder against tension in said spring to close the open end of the cylinder when a pressure differential of at least a predetermined magnitude exists between the interior of the cylinder and atmospheric air in the dome, and whereby the spring moves the piston outwardly of the cylinder to admit air through the open end of the cylinder when said pressure differential is less than said predetermined magnitude.

2. An air admission regulator valve as recited in claim 1, wherein the central bore in the closed end of the shell is threaded and an externally threaded nipple engaged in the central bore in the shell for connecting the valve to said intake manifold with the interior of the valve cylinder communicating therewith via said nipple.

3. An air admission regulator valve as recited in claim 2, further comprising a washer in said valve cylinder movably interposed between one end of the spring and the closed end of the cylinder, whereby one end of the nipple can engage said washer through the bore in the closed end of the cylinder for adjusting the tension in the spring.

4. An air admission regulator valve as recited in claim 3, further comprising a lock nut on said nipple engageable with the closed end of the shell for locking the nipple to the shell.

5. An air admission regulator valve as recited in claim 3, further comprising a fine mesh screen interposed between the other end of the spring and said piston for screening air passing into the cylinder from the interior of the dome.

6. An air admission regulator valve as recited in claim 1, wherein said piston has a neck of reduced diameter between said head and said skirt, said neck having a plurality of radial openings to admit air into the cylinder from the interior of the dome.

7. An air admission regulator valve as recited in claim 1, wherein said piston has a shoulder defined at one end of the skirt, and a screw removably mounted in a side of said valve cylinder and extending radially inwardly thereof to bear on said shoulder to hold the piston in the valve cylinder.

8. An air admission regulator valve as recited in claim 1, further comprising a ring interposed between said piston, and one end of said spring, and a fine mesh screen disposed across said ring for screening air passing into the cylinder from the interior of the dome.

9. An air admission regulator valve as recited in claim 7, wherein the central bore in the closed end of the shell is threaded, and an externally threaded nipple engaged in the central bore of the shell for connecting the valve to said intake manifold with the interior of the valve cylinder communicating therewith via said nipple.

10. An air admission regulator valve as recited in claim 3, wherein said piston has a shoulder defined at one end of the skirt, and a screw removably mounted in a side of said valve cylinder and extending radially into inward position thereof to bear on said shoulder to hold the piston in the valve cylinder, a ring interposed between said piston and one end of said spring, and a fine mesh screen disposed across said ring for screening air passing into the cylinder from the interior of the dome.

References Cited

UNITED STATES PATENTS

| 1,303,817 | 5/1919 | Hugill | 137—480 |
| 1,579,251 | 4/1926 | Schossow | 137—504 |
| 2,884,950 | 5/1959 | Settelmayer | 137—480 |

WILLIAM F. O'DEA, *Primary Examiner.*

H. W. WEAKLEY, *Assistant Examiner.*